H. ARON.
INDUCTION SUPPLY METER FOR POLYPHASE ELECTRIC CURRENTS.
APPLICATION FILED JULY 28, 1908.
944,167.
Patented Dec. 21, 1909.
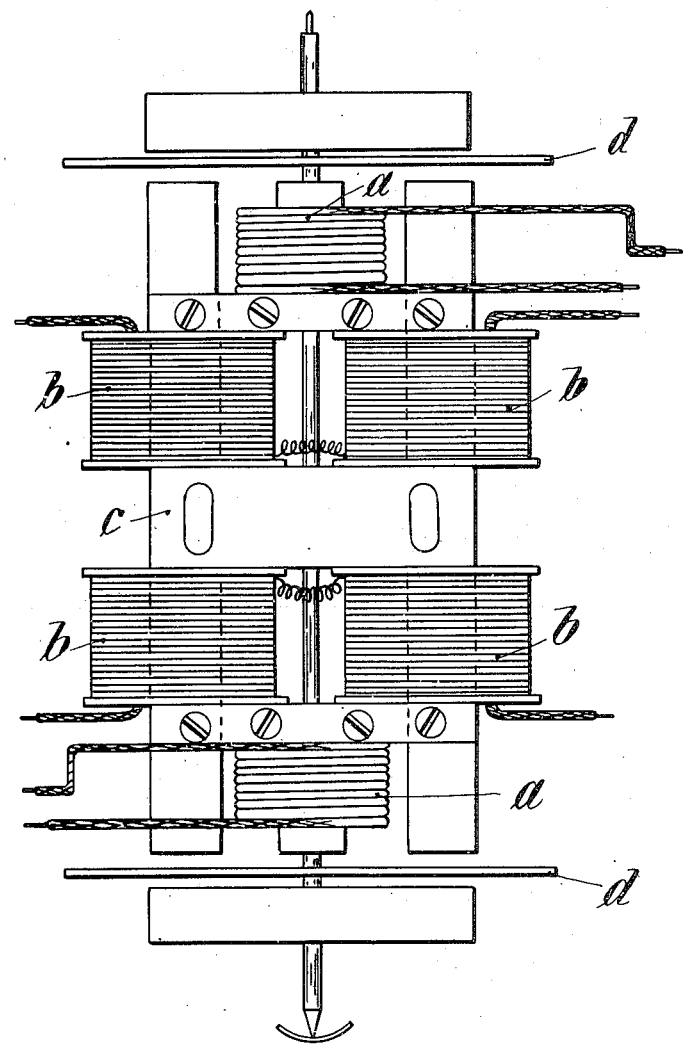
Witnesses:—
Inventor:—
Hermann Aron

UNITED STATES PATENT OFFICE.

HERMANN ARON, OF CHARLOTTENBURG, GERMANY.

INDUCTION SUPPLY-METER FOR POLYPHASE ELECTRIC CURRENTS.

944,167. Specification of Letters Patent. Patented Dec. 21, 1909.

Application filed July 28, 1908. Serial No. 445,825.

*To all whom it may concern:*

Be it known that I, HERMANN ARON, Ph. D., electrician, citizen of Germany, subject of the King of Prussia and Emperor of Germany, residing at Charlottenburg, near Berlin, in the Kingdom of Prussia and Empire of Germany, have invented new and useful Improvements in Induction Supply-Meters for Polyphase Electric Currents, of which the following is a specification.

Induction supply meters for polyphase electric currents, in accordance with the Aron system of connections, comprise two sets of driving coils each of which acts on a disk of aluminium usually carried on one arbor or shaft. Hitherto the pressure coils of each set have been arranged on separate iron cores and, in consequence of the sets being disposed one above the other, the apparatus has occupied a considerable space. According to my present invention among other advantages I reduce the space occupied by making the iron cores of the electro-magnets of both sets in one piece, or by connecting them so that they form practically one piece, in such a manner that the lines of magnetic force of both sets pass partly together through the same portion of the iron. A simple arrangement according to this invention can be made if the iron cores of the sets be U shaped and be connected together so that they form an H shaped body on the two upper limbs of which the coils of one of the sets are carried, while the coils of the other set are carried on the two lower limbs, the cross-piece forming the portion through which the lines of magnetic force of both sets pass. The H shaped body can however be made in one piece, or in two, or more, pieces, as desired.

The accompanying drawing illustrates a construction in accordance with my invention. In this drawing the series coils are marked $a$ and the pressure coils are marked $b$. The H shaped electro-magnetic core common to both sets is marked $e$ and its cross-piece $c$. The aluminium disks are marked $d$ and their common shaft or arbor $f$.

Having now particularly described and ascertained the nature of my said invention and in what manner the same is to be performed I declare that what I claim is:—

1. In an induction supply meter for polyphase electric currents having two sets of driving coils disposed one above the other and comprising series coils and pressure coils for both sets, iron cores for the pressure coils of both sets, said cores of both sets consisting of one H-shaped body having a part which constitutes a passage for the lines of magnetic force of both of the said sets, and a driving disk for each set.

2. In an induction supply meter for polyphase electric currents having two sets of driving coils disposed one above the other and comprising series coils and pressure coils for both sets, an H-shaped iron body forming the cores for said pressure coils, the coils of one of the sets being carried on the two upper limbs of said H-shaped body and the coils of the other set on its two lower limbs, the cross-piece of said H-shaped body forming a portion through which the lines of magnetic force of both sets pass, and a driving disk for each set.

In testimony whereof I have hereunto set my hand in presence of two subscribing witnesses.

HERMANN ARON.

Witnesses:
WOLDEMAR HAUPT,
HENRY HASPER.